United States Patent
Rodrigues de Lima

(10) Patent No.: US 9,544,114 B2
(45) Date of Patent: Jan. 10, 2017

(54) METHOD AND APPARATUS FOR CHANNEL ESTIMATION AND EQUALIZATION

(71) Applicant: Instituto de Pesquisas Eldorado, Campinas (BR)

(72) Inventor: Eduardo Rodrigues de Lima, Campinas (BR)

(73) Assignee: Instituto de Pesquisas Eldorado, Campinas (BR)

( * ) Notice: Subject to any disclaimer, the term of this patent is extended or adjusted under 35 U.S.C. 154(b) by 0 days.

(21) Appl. No.: 15/041,304

(22) Filed: Feb. 11, 2016

(65) Prior Publication Data

US 2016/0241370 A1    Aug. 18, 2016

Related U.S. Application Data

(60) Provisional application No. 62/115,418, filed on Feb. 12, 2015.

(51) Int. Cl.
*H04L 27/00* (2006.01)
*H04L 5/00* (2006.01)
*H04L 27/26* (2006.01)

(52) U.S. Cl.
CPC .......... *H04L 5/0048* (2013.01); *H04L 5/0007* (2013.01); *H04L 27/2601* (2013.01)

(58) Field of Classification Search
CPC .......... H04L 27/2647; H04L 25/03891; H04L 27/2601; H04B 7/0413
USPC .......... 375/260, 267, 371; 370/252, 469
See application file for complete search history.

(56) References Cited

U.S. PATENT DOCUMENTS

2003/0058968 A1\*  3/2003  Thomson ............ H04L 27/2675
                                                         375/340
2005/0058193 A1\*  3/2005  Saed ................. H04L 25/03159
                                                         375/232

\* cited by examiner

*Primary Examiner* — Khai Tran
(74) *Attorney, Agent, or Firm* — Grouwstra IC & Software Patent

(57) ABSTRACT

An inverse channel estimation method includes receiving a modulated signal with a pilot. A local reference pilot, matching the received pilot as it was prior to transmission, is divided by a scaled version of the received pilot's power. The division result is scaled again and multiplied with a conjugate value of the received pilot signal, to obtain the inverse channel estimate. Scaling may be performed using bit shifting. The division is performed using a CORDIC algorithm. If multiple pilots are received, interpolation can be performed to provide channel estimates for time and/or frequencies in between. Interpolation can be based on the Farrow method. The received signal may be equalized by multiplying it with the inverse channel estimate.

14 Claims, 5 Drawing Sheets

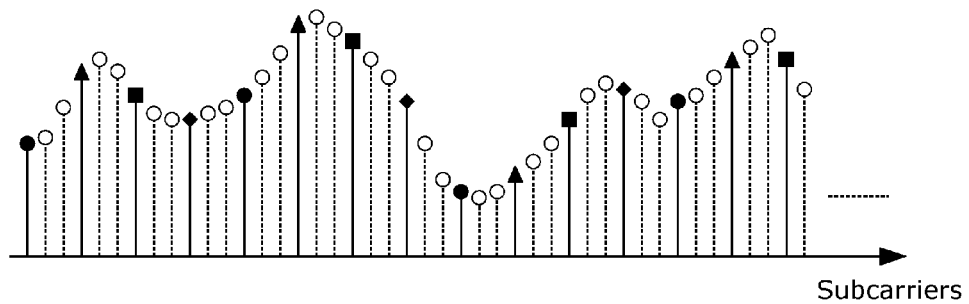
Fig. 1 – Prior Art
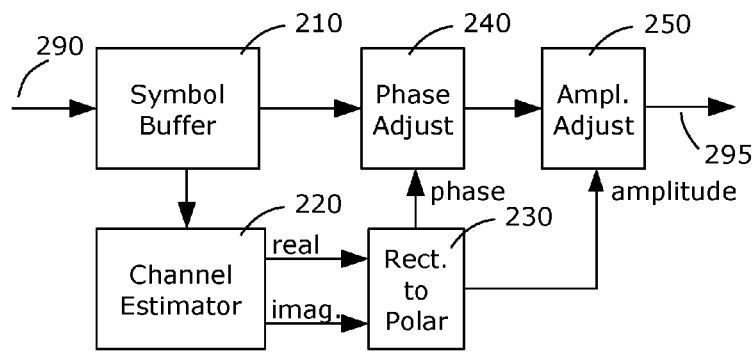
Fig. 2 – Prior Art

METHOD AND APPARATUS FOR CHANNEL ESTIMATION AND EQUALIZATION

CROSS REFERENCES TO RELATED APPLICATIONS

This application claims priority from U.S. Provisional Patent Application Ser. No. 62/115,418, entitled "Method and Apparatus for Channel Estimation and Equalization", filed on Feb. 12, 2015, which is hereby incorporated by reference herein for all purposes.

BACKGROUND

The present invention relates to OFDM-based digital receivers and single-carrier digital receivers. This includes digital television and radio receivers, digital modems, wireless networks, powerline networks and other wideband digital communication systems.

Digital data transmission systems transfer blocks of digital data via wireless, wired (electrical), and optical media. A transmitter modulates signals with data from the digital data blocks and transfers the signals through the media. A receiver receives the modulated signals from the media and demodulates them to reconstruct the digital data blocks.

Modern modulation systems, such as orthogonal frequency-division multiplexing (OFDM), offer a high spectral efficiency, i.e. a highly efficient use of bandwidth that is available in the medium. However, to achieve this efficiency the medium must meet tight requirements.

In practice, the media may introduce changes to the modulated signals, such as dispersion, echos, frequency-dependent attenuation and delay, distortion, and the addition of noise and interference from various sources. Some or all of these changes may be time-dependent. As a result, demodulation may be compromised, resulting in bit errors or the inability to reconstruct the original bitstream. To combat these problems, digital receivers often include an equalizer function, which compensates the received modulated signals for estimated imperfections of the channel transfer characteristics, usually called the "channel transfer function". Channel estimates may include time and frequency-dependent changes in amplitude and phase.

In a single-carrier digital data transmission system, a sinusoid wave signal called the "carrier" is modulated with the digital data. To support estimating the channel transfer function, some of the time a reference signal called a "pilot" may be transmitted. In a stationary channel it would be sufficient to transmit a pilot only once, for instance prior to transmitting the data. In a quasi-stationary channel, pilots need to be transmitted regularly, possibly interrupting the data. Non-stationary channels, such as in mobile wireless applications, require pilots to be transmitted often. If data is packaged into "symbols", each symbol may contain both data and one or more pilots.

OFDM may utilize a large number of very closely orthogonally spaced carriers (called "subcarriers") that each are modulated with a part of the digital data to be transferred between the transmitter and receiver. For orthogonality, typically the subcarriers are equidistant and carry equal amounts of information, resulting in a very rectangular frequency spectrum. The use of many subcarriers means that each subcarrier need only carry a small fraction of the digital data and as a result, each subcarrier is modulated with low-bandwidth data. The resulting long transmission time protects the signal against short-duration interferences, such as noise spikes caused by lightning. However, the close subcarrier spacing makes the system very sensitive to frequency errors, such as offsets, frequency-dependent delays (phase errors) and attenuation, and fixed-frequency interference.

OFDM distributes blocks of digital data over the subcarriers and transmits those as OFDM symbols. For the duration of a first symbol, each subcarrier transmits its low-bandwidth part of a first data block, and for the duration of the next symbol each subcarrier transmits its low-bandwidth part of the next data block. To protect against interference from echos of prior symbols (e.g. due to multipath reception), each symbol is preceded by a guard interval containing a cyclical extension of the symbol itself. Typically, the guard interval is short compared to the symbol, but long enough to cover the worst expected echos. When operating optimally, the receiver does not demodulate data received during the guard interval.

However, the guard interval does not solve all problems caused by multipath reception. One effect of receiving a signal with one or more echos is that the echos will boost the signals for some frequencies and attenuate them for other frequencies. As a result, some subcarriers may be received stronger than other subcarriers, and also with different phase. Like other receivers, OFDM receivers compensate for this by constantly estimating the channel transfer function and equalizing the received signal based on the estimated channel transfer function.

The OFDM system facilitates channel estimation by including pilot carriers with known coding in each symbol. Pilots may have a fixed location, or their location may vary, in which case they are called "scattered pilots". For instance, the Integrated Services Digital Broadcasting Terrestrial (ISDB-T) system has scattered pilots every thirteenth carrier. In a first symbol the scattered pilots begin on the first carrier; in a second symbol the scattered pilots begin on the fourth carrier; in a third symbol the scattered pilots begin on the seventh carrier; in a fourth symbol the scattered pilots begin on the tenth carrier; in a fifth symbol the scattered pilots again begin on the first carrier, and so on. Pilots may be boosted versus the data carriers to increase the accuracy of channel estimators, which will be less sensitive to noise. Some OFDM systems, including ISDB-T, pseudo-randomly switch the phase of pilot carriers between zero and 180 degrees to help increase the channel estimators' phase accuracy.

FIG. 1 illustrates channel estimation in an OFDM system. The figure shows an amplitude-versus-frequency plot 100 of pilot subcarriers (drawn with solid vertical lines) received over the course of four symbols. Some of the pilots are received during reception of a first symbol. Others are received in the second, third, and fourth symbols, respectively. If the channel transfer function can be assumed quasi-stationary during the time of transmission of the four respective symbols, the channel transfer function for the data carriers can be estimated by a relatively straightforward interpolation. For reception in fast-moving mobile systems the quasi-stationary assumption may not hold, and more sophisticated 3D interpolation may be required. FIG. 1 shows the channel transfer function estimates for data carriers drawn with dotted lines.

Many interpolation systems are used in the art. Conventionally, solutions often use Lagrange interpolation or low-pass filtering. Lagrange interpolation requires continuous recalculation of many coefficients, which is a high computational burden. Low-pass filtering has the advantage of fixed coefficients, but there are very many—still giving a high computational burden.

Two methods are often used for channel estimation: "minimum mean-square error" (MMSE) and "least-squares" (LS), see for instance Jan-Jaap van de Beek et al., "On Channel Estimation in OFDM Systems", IEEE Proceedings of Vehicular Technology Conference (VTC '95), vol. 2, pp. 815-819 (September 1995). The MMSE method is very accurate, but complex. The LS method, sometimes referred to as Zero-Forcing Estimation, has lower complexity and is somewhat less accurate.

Even the LS channel estimation method traditionally includes a complex division, which is usually implemented in hardware. Standard division blocks are fast, but expensive, resulting in high receiver cost.

FIG. 2 illustrates a conventional channel equalizer 200, operating in the frequency domain. Input 290 of symbol buffer 210 receives one or more symbols, the symbols typically including both pilots and data. Based on the pilots, or whatever other information can be learned from the buffered symbols, channel estimator 220 provides a channel estimation. The channel estimation is typically one complex number per carrier, i.e. for a single-carrier system it would be a single real and imaginary number pair, and for an OFDM system with, say, 8,192 carriers it would be 8,192 such pairs. Block 230 converts the complex numbers to polar coordinates in a rectangular-to-polar conversion, yielding amplitude-phase pairs. Phase adjust block 240 adjusts data carriers from the symbol buffer for their phase, and amplitude adjust block 250 adjusts the phase-adjusted carriers for their amplitude. Hence, the equalizer output signal 295 has been frequency-adjusted for both its phase and amplitude, or in other words, has been equalized. In a mathematically linear system, the order of phase adjustment 240 and amplitude adjustment 250 is irrelevant; the blocks may be swapped, and an equalizer may adjust the amplitude first and the phase last.

A few prior solutions have realized that channel equalization may benefit from the use of the Coordinate Rotation Digital Computer (CORDIC) algorithm, first proposed by Jack E. Volder, "The CORDIC Trigonometric Computing Technique", IRE Transactions on Electronic Computing, pp. 330-334, IRE/IEEE (1959). CORDIC is an algorithm especially suitable for implementation in or execution on digital hardware, using successive cycles to compute a result with increasing accuracy, based on the digitally inexpensive operations of adding, subtracting, and multiplying by factors of two (i.e., bit-shifting). A CORDIC block can operate in two different modes to compute various types of result. One mode is called vectoring mode, often used for rectangular-to-polar conversion. The other mode is called rotation mode, often used for calculating the sine and cosine of an angle, and for polar-to-rectangular conversion.

One such prior solution is described in U.S. Pat. No. 7,423,960, "Orthogonal Frequency Division Multiplexing (OFDM) Equalizer", by Kuei-Ann Wen (2008). In accordance with the architecture illustrated in FIG. 2, Wen uses CORDICs (after having performed channel estimation) for rectangular-to-polar conversion as well as for phase rotation. Her approach yields considerable cost savings, but a simpler approach could save even more.

Moisès Serra et al. similarly describe in "Implementation of a Channel Equalizer for OFDM Wireless LANs" (Proceedings of the 15$^{th}$ IEEE International Workshop on Rapid System Prototyping, 2004) using a CORDIC for the rectangular-to-polar conversion. They then obtain inverse coefficients with an inverter using the "Hung" algorithm. They use a second CORDIC for phase tracking, and a third one for equalization. Although their design is less complex than some conventional designs, it is still relatively complex. Their architecture limits use to the frame structure typical for HIPERLAN symbols. The Hung algorithm needed for inversion is a Taylor series approximation, resulting in a large 16% relative error even with 10-bit data precision.

SUMMARY

Digital data transmission systems can offer a high spectral efficiency. Reception of the data is impaired by imperfections in the channel over which the data is sent. Digital data receivers include equalizers to compensate for the estimated imperfections of the channel transfer characteristics, usually called the "channel transfer function". Embodiments of the invention use a modified "least-squares" (LS) method to estimate the inverse of the channel transfer function, and use the CORDIC algorithm to perform a critical division in this method.

In an embodiment, the invention provides a method for estimating the inverse channel transfer function. The method begins with receiving a modulated signal that includes a pilot, and storing it in a buffer. It handles the signal in the frequency domain, where the received pilot may be expressed as a complex number. Next steps include calculating the received pilot's power, and a conjugate value. Also, the method generates or retrieves a local reference pilot. The local reference pilot matches the received pilot as it was before transmission. The method uses the CORDIC algorithm to divide the value of the local reference pilot by the received pilot's power. The next step is to multiply the CORDIC division result with the conjugate value, obtaining the inverse channel transfer function estimate.

The CORDIC may have a threshold value. To prevent output overflow, the method includes scaling up the denominator number representing the received pilot's power prior to the CORDIC, and scaling the CORDIC result up, again, to compensate for the earlier denominator scaling. Embodiments of the invention may perform scaling by bit shifting, or by other ways known in the art.

Embodiments of the invention may obtain multiple inverse channel transfer function estimates and perform interpolation using the multiple inverse channel transfer function estimates. Interpolation may use the Farrow method.

Further embodiments of the invention may multiply at least parts of the received modulated signal with the inverse channel transfer function estimate to obtain an equalized received modulated signal.

In a further aspect, an embodiment of the invention comprises an apparatus for inverse channel estimation, including a buffer for storing a modulated signal including a pilot; a first processing unit coupled with the buffer and operationally configured to calculate a power of the pilot; a second processing unit coupled with the buffer and operationally configured to calculate a conjugate value of the pilot; a left-shift module coupled with the first processing unit; a CORDIC unit operationally configured to perform a division on a numerator input signal and a denominator input signal, wherein the numerator input is capable of receiving a local reference pilot signal, and wherein the denominator input is coupled with the left-shift module; and a first multiplier including a real input and a complex input, wherein the real input is coupled with a CORDIC unit output, and the complex input is coupled with a second processing unit output, and including an output configured to provide an output signal that is a complex multiplication of a first signal on the real input and a second signal on the complex input.

In a yet further aspect, an embodiment of the invention comprises a system for channel estimation, comprising a digital signal processor coupled with a program memory and coupled with a data memory, the digital signal processor configured to control a read address of the program memory and to control a read and a write address of the data memory, wherein the digital signal processor is operatively configured to read and execute software instructions stored in the program memory, the software instructions comprising the method described above.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The invention will be described with reference to the drawings, in which:

FIG. 1 illustrates channel estimation in an OFDM system;

FIG. 2 illustrates a conventional channel equalizer;

DETAILED DESCRIPTION

Digital data transmission systems can offer a high spectral efficiency. Reception of data is impaired by imperfections in the channel over which the data is sent. Such imperfections may include dispersion, echos, frequency-dependent attenuation and delay, distortion, and the addition of noise and interference from various sources. Digital data receivers typically include equalizers to compensate for estimated imperfections of the channel transfer characteristics, usually called the "channel transfer function". Channel transfer function estimates may include time and frequency-dependent changes in amplitude and phase.

Embodiments of the invention use a modification of the "least-squares" (LS) method to estimate the inverse of the channel transfer function, and use the CORDIC algorithm to perform a critical division in this method. Use of both CORDIC and the LS method provides a very low-cost way for both inverse channel transfer function estimation and channel equalization. For some applications, embodiments may reduce the cost further by using Farrow-style interpolation.

Figure 3A:
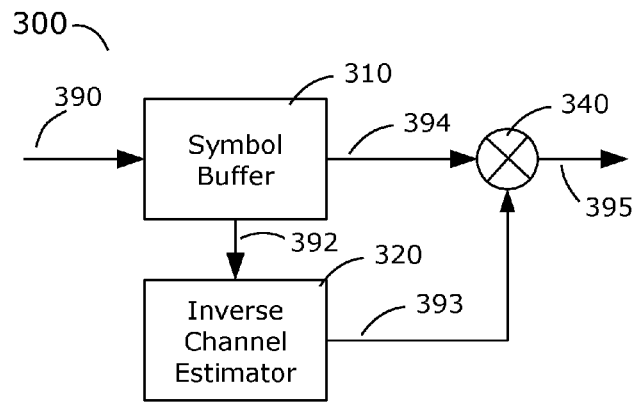
FIGS. 3A-B illustrate a channel equalizer according to an embodiment of the invention.
Figure 3B:
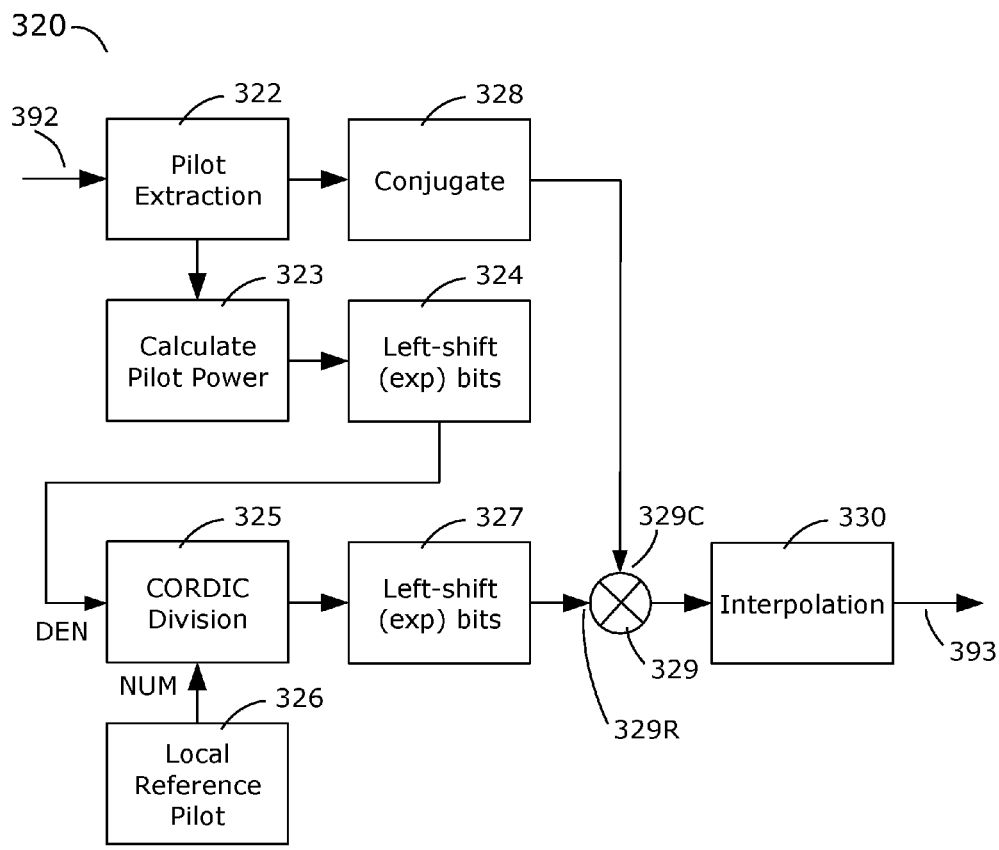

FIGS. 3A-B illustrate a channel equalizer 300 according to an embodiment of the invention. FIG. 3A provides an architecture overview. This embodiment receives an input signal 390 including at least one received carrier modulated with one or more symbols of digital data including a pilot. Input signal 390 may include one or more received symbols, represented in the frequency domain. The embodiment stores input signal 390 in symbol buffer 310 and forwards it (392) to inverse channel estimator 320. As described below, inverse channel estimator 320 estimates the inverse (393) of the channel transfer function, which may include one or more complex numbers. Multiplier 340 multiplies the stored one or more received symbols (394) of input signal 390 retrieved from symbol buffer 310 with the inverse channel transfer function estimate (393) to obtain an equalized output signal 395. Multiplier 340 may include a multiplier for complex numbers.

FIG. 3B illustrates details of the inverse channel estimator 320. Its input signal 392 comes from symbol buffer 310 and includes at least a part of the one or more received symbols. This embodiment extracts one or more received pilots from the input signal 392 in block 322. The channel transfer function H(k), for the k-th pilot, is defined as the (complex) value of the received pilot divided by the value of the transmitted pilot:

$$H(k) = \frac{P_{received}(k)}{P_{transmitted}(k)}$$

For each extracted received pilot, inverse channel estimator 320 calculates an inverse channel transfer function estimate $1/H_e(k)$, by performing complex division of a locally generated k-th reference pilot $P_{reference}(k)$, matching the transmitted pilot $P_{transmitted}(k)$, and the extracted received pilot $P_{received}(k)$ as follows:

$$\frac{1}{H_e(k)} = \frac{P_{reference}(k)}{P_{received}(k)}$$

Assuming that all reference pilots $P_{reference}(k)$ can be represented by a real number a(k) (i.e. they have a phase shift of 0 or 180 degrees), and all received pilots $P_{received}(k)$ are represented by complex numbers e(k)=c(k)+jd(k), wherein $j^2=-1$, the inverse channel transfer function estimate becomes:

$$\frac{1}{H_e(k)} = \frac{a(k)}{c(k) + jd(k)}$$

Multiplying both the numerator and denominator by the conjugate c(k)−jd(k) of the received pilot gives:

$$\frac{1}{H_e(k)} = \frac{a(k)}{c(k) + jd(k)} * \frac{c(k) - jd(k)}{c(k) - jd(k)} = \frac{a(k)}{c(k)^2 + d(k)^2} * (c(k) - jd(k))$$

In this formula, the denominator $c(k)^2+d(k)^2$ represents, in accordance with Pythagoras, the power $e(k)^2$ of the received pilot $P_{received}(k)$, wherein $|e(k)|^2=c(k)^2+d(k)^2$, and wherein $|e(k)|$ represents the module (amplitude) of the received pilot. The formula shows that the inverse channel transfer function estimate can be calculated by dividing the amplitude a(k) of the reference pilot by the received pilot power $|e(k)|^2$, and multiplying the result with the conjugate (c(k)−jd(k)) of the received pilot. The received pilot power $|e(k)|^2$ can be obtained by squaring its absolute value:

$$|e(k)|^2 = c(k)^2 + d(k)^2 = |c(k) + jd(k)|^2$$

With reference to the embodiment illustrated in FIG. 3B, for each extracted received pilot, block 323 calculates its power, for example by calculating the square of the absolute value of the received pilot's module. It left-shifts the result by (exp) bits in block 324, wherein exp is a natural number of zero or greater. A method to determine exp will be illustrated later herein with reference to FIG. 5. Left-shifting a digital number by exp bits is equivalent to multiplying (scaling) the digital number by 2 to the power exp. This scaling of the digital number is needed to prevent overflow of the next operation. The embodiment forwards the scaled received pilot power to a denominator input (DEN) of CORDIC 325, which is used in linear vectoring mode allowing it to perform a division of real numbers. The embodiment generates or retrieves a local reference pilot in block 326, which it forwards to a numerator input (NUM) of CORDIC 325. In some embodiments supporting some OFDM systems, the local reference pilot may include a boosted amplitude and/or, for instance pseudo-randomly, inverted phase (only 0 and 180 degrees are supported as the local reference pilot is represented by a real number). CORDIC 325 performs a low-cost division whose precision is determined by a number of iterations it is set to provide. In some embodiments, CORDIC 325 may be pipelined to provide faster successive results. CORDIC 325 divides the amplitude of the local reference pilot from block 326 by the scaled received pilot's power from block 324.

The embodiment left-shifts the CORDIC division result in block 327 by (exp) bits to compensate for the denominator left-shifting in block 324. Therefore, block 327 outputs a value that represents the value of the local reference pilot divided by the received pilot's power. The embodiment calculates a conjugate value of the received pilot in block 328 and multiplies the conjugate value of the received pilot with the output value from block 327 in multiplier 329 to obtain an estimate for the inverse channel transfer function relevant for the received pilot's carrier at the time the pilot was received. Multiplier 329 may include a real input 329R to receive the scaled division result (a real number) and a complex input 329C to receive the conjugate value of the received pilot (a complex number).

Embodiments of the invention may forward the received pilot's inverse channel function estimate directly to channel estimator 320 output 393 and thus to multiplier 340, or may forward the inverse channel function estimate to interpolation block 330 to estimate the inverse channel transfer function for carriers other than the received pilot's carrier, and/or for times other than the time the pilot was received.

Embodiments may use any suitable interpolation algorithm, including Lagrange interpolation and low-pass filtering. For mobile reception, embodiments may use a three-dimensional interpolation algorithm. In OFDM systems where support for single-frequency networks (SFNs) is not important, embodiments may use, for instance, Farrow interpolation as an inexpensive method to obtain interpolation results.

Interpolation block 330 provides at its output 393, as a result of its interpolation, inverse channel transfer function estimates for (a) carrier(s) relevant to the symbol(s) stored in symbol buffer 310, and for (a) time(s) relevant to the reception of the stored symbol(s).

Whereas the description of FIGS. 3A-B has been presented in the context of one or more symbols of OFDM data and pilots, it is equally valid for single-carrier data transmission systems, and for operation on data units that may be smaller than one symbol.

Figure 4:
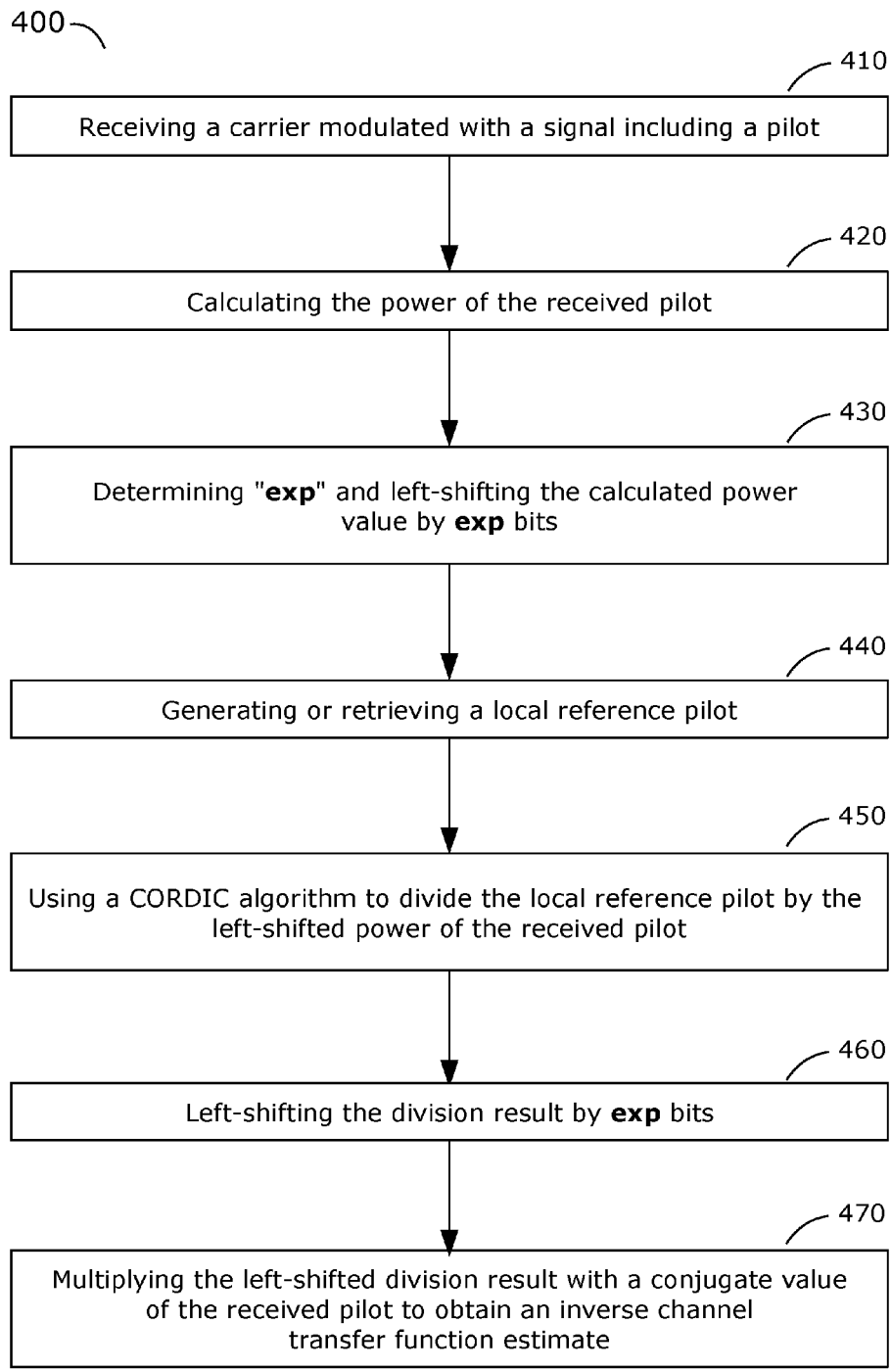
FIG. 4 illustrates a method for inverse channel estimation according to an embodiment of the invention.

FIG. 4 illustrates a method 400 for inverse channel transfer function estimation in a digital radio receiver, according to an embodiment of the invention. The method comprises the following steps.

Step 410—In the digital radio receiver, receiving a carrier modulated with a signal including a pilot and representing the received modulated carrier in the frequency domain. Embodiments of the invention store the received modulated carrier in a buffer and extract the pilot from the received modulated signal. Some embodiments extract multiple received pilots. Received pilots may be located on a single or on multiple carriers, such as, for example, in an OFDM system. A received pilot may be represented by a complex number. Pilots may be boosted versus other modulated data, and the phase of a pilot may be inverted by, for instance, a pseudo-random sequence.

Step 420—In a digital processing unit, calculating (a value proportional to) the power of the received pilot. For example, the square of the amplitude or of the module of the received pilot is proportional to its power.

Step 430—Determining a bit-shift value exp and left-shifting the calculated power of the received pilot by exp bits. Embodiments determine the bit-shift value based on parameters including the received pilot power and a threshold of a CORDIC algorithm. For instance, an implementation of the CORDIC algorithm may require that the result of a division operation is smaller than 2, to prevent overflow. If the numerator would have a value of 1.333, then the denominator should be at least 0.667 to satisfy the overflow requirement. A method to determine exp will be illustrated later herein with reference to FIG. 5. Embodiments may use any appropriate method other than left-shifting for scaling up the value of the received pilot's power. For instance, an embodiment may scale the value of the received pilot's power by multiplying it with a floating-point value derived from a CORDIC threshold and the received pilot's power.

When the CORDIC algorithm has a lower bit precision than the calculated power of the received pilot, and the calculated power of the received pilot is large, embodiments may use right-shifting the calculated power of the received pilot as a way to operate the CORDIC in its best operational point, e.g. to minimize quantization errors. In this case, exp can have a negative value to modify left-shifting into right-shifting.

Step 440—Generating or retrieving a local reference pilot. The local reference pilot may be represented by a real number. In line with the received pilot, the local reference pilot may be boosted versus modulated data, and its phase may be inverted by a pseudo-random sequence. Embodiments generate or retrieve the local reference pilot to match the received pilot as it was prior to transmission.

Step 450—In a hardwired, soft-wired, or programmable processor, using a CORDIC algorithm to divide the local reference pilot value by the left-shifted power value of the received pilot, obtaining a division result. Embodiments use the local reference pilot value as the numerator of the division, and the left-shifted power of the received pilot as the denominator of the division. In this context, a hardwired processor means a processor that includes fixed components and connections dedicated to the CORDIC algorithm; a soft-wired processor means a processor implemented in for instance a field-programmable gate array (FPGA) where components and connections are at least temporarily dedicated to the CORDIC algorithm; and a programmable processor means a processor whose components and connections are used for executing software or firmware that may include the CORDIC algorithm.

Step 460—Left-shifting the division result by exp bits. Embodiments perform the left-shift to compensate for the left-shift operation from step 430. In case step 430 uses a scaling method other than bit-shifting, an embodiment uses the same scaling method in this step 460.

Step 470—Multiplying the left-shifted division result with a conjugate value of the received pilot to obtain an inverse channel transfer function estimate. The inverse channel transfer function estimate relates to a frequency of the carrier onto which the pilot is modulated, and to a time the pilot was received. Embodiments receiving multiple pilots may therefore have multiple inverse channel transfer function estimates, each relating to a carrier related to the respective pilot and each related to a time the respective pilot was received.

Embodiments of the invention may perform interpolation between multiple inverse channel transfer function estimates to obtain estimates related to carriers in between those modulated with pilots, and/or related to carriers in between times that those carriers are modulated with pilots. Embodiments may use any commonly used interpolation algorithm to obtain such interpolation results, including Lagrange interpolation, low-pass filtering, Farrow interpolation, and others. Embodiments may use simple interpolation, 2-D interpolation, 3-D interpolation, and other interpolation techniques.

Embodiments of the invention may further multiply the obtained inverse channel transfer function estimate(s) with the modulated carrier(s) to equalize the received modulated signal.

Figure 5:
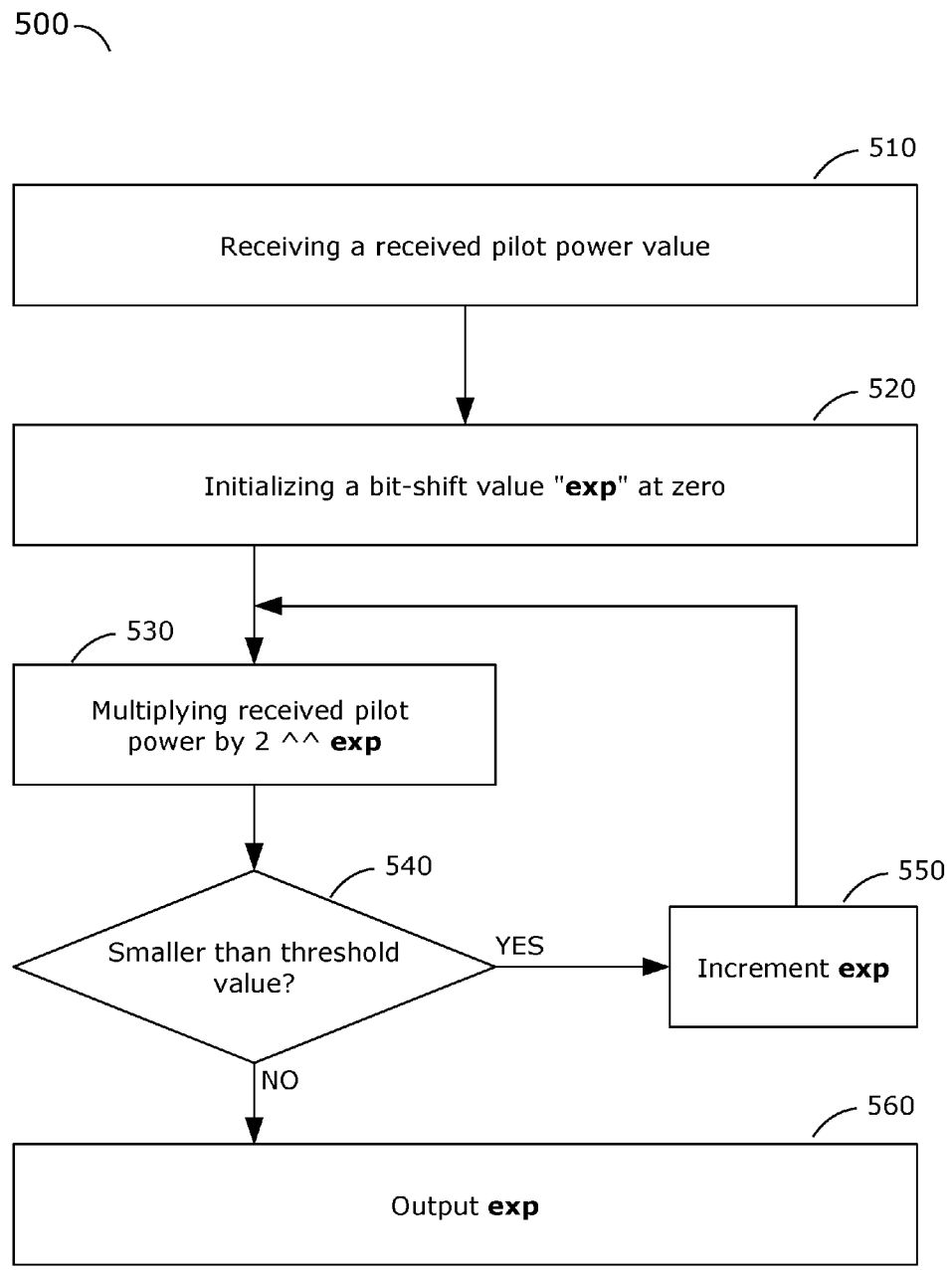
FIG. 5 illustrates details of a method for determining a bit-shift value according to an embodiment of the invention.

FIG. 5 illustrates details of a method 500 for determining a bit-shift value exp according to an embodiment of the invention. The method comprises the following steps.

Step 510—In a hardwired, soft-wired, or programmable processor that is part of a digital radio system, receiving or retrieving a received pilot power value. Embodiments may extract the pilot from a symbol buffer storing at least part of a received modulated signal. The buffer may hold the at least part of the received modulated signal as a signal represented in the frequency domain. Embodiments may calculate the received pilot power value, for example, from a square of the pilot's module, or from adding the squares of the real and imaginary parts of its value. In this context, a hardwired processor means a processor that includes fixed components and connections dedicated to determining the bit-shift value; a soft-wired processor means a processor implemented in for instance a field-programmable gate array (FPGA) where components and connections are at least temporarily dedicated to determining the bit-shift value; and a programmable processor means a processor whose components and connections are used for executing software or firmware that may include determining the bit-shift value.

Step 520—In the processor, initializing a bit-shift value "exp" at zero.

Step 530—Calculating the received pilot power multiplied by 2 to the power (exp) to obtain a left-shift candidate. Embodiments may perform this calculation, for instance, by left-shifting the received pilot power value by exp bits.

Step 540—Comparing the left-shift candidate with a threshold value to determine if the left-shift candidate is smaller than the threshold value. The threshold value may represent a CORDIC threshold, or may be related to a CORDIC threshold.

Step 550—In response to determining that the left-shift candidate is smaller than the threshold, incrementing exp and repeating steps 530 and 540.

Step 560—In response to determining that the left-shift candidate is not smaller than the threshold, outputting the bit-shift value exp.

Some embodiments of the invention may combine steps 530-550 by determining the position of the first non-zero bit of the received pilot power, and subtracting from it the position of the first non-zero bit of the threshold to obtain the value of exp. This simplification works for thresholds of the general binary form [0 0 0 . . . ] 0 1 [1 1 . . . 1] (one or more binary zeroes followed by one or more binary ones).

Further embodiments may allow for negative values of exp, turning the left-shift into a right-shift for large values of the received pilot power. These embodiments would determine if the received pilot power is larger than a second threshold value (for instance, determined by the maximum resolution of the CORDIC), and if so, decrement exp to right-shift the value, dividing it by 2 to the power (exp). This may help use the CORDIC in its best range, for instance by minimizing digitization noise.

Figure 6:
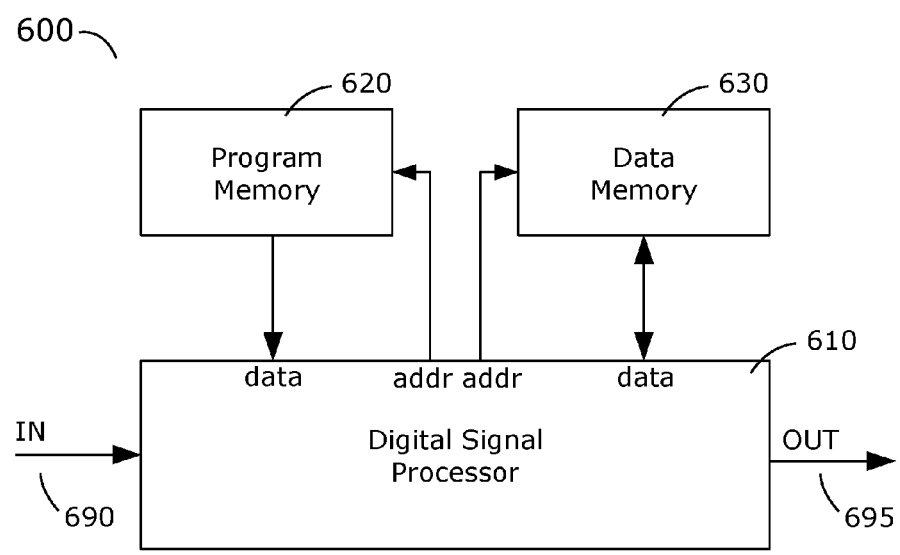
FIG. 6 illustrates a system capable of performing channel estimation and equalization according to embodiments of the invention.

FIG. 6 illustrates a system 600 capable of performing channel estimation and equalization according to embodiments of the invention. System 600 includes a digital signal processor (DSP) 610, coupled with a program memory 620 and a data memory 630, wherein DSP 610 controls read addresses of program memory 620 and read/write addresses of data memory 630. DSP 610 is operatively configured to read and execute software instructions stored in program memory 620 and to read data from and write data into data memory 630. DSP 610 receives data, representing a received carrier modulated with a signal including a pilot, at its input 690. It outputs data at its output 695, the output data representing at least one of the estimated channel transfer function; the inverse estimated channel transfer function; or the carrier equalized for the estimated channel transfer function.

Embodiments of the invention may combine program memory 620 and data memory 630 into a unified memory.

The software includes instructions for DSP 610 to execute the following steps: receiving a modulated signal including a pilot; calculating a value representing a received pilot power; determining a bit-shift value and left-shifting the value representing the received pilot power by the bit-shift value; using a CORDIC algorithm to divide a local reference pilot value by the left-shifted value representing the received pilot power, obtaining a division result; and multiplying the division result with a conjugate value of the received pilot to obtain an inverse channel transfer function estimate.

Although the description has been described with respect to particular embodiments thereof, these particular embodiments are merely illustrative, and not restrictive. For example, each value representing a pilot value or a data value may be scaled, and operations performed on a single carrier can be performed on multiple carriers. As another example, scaling prior to and/or after the CORDIC division may be performed using a bit-shift method, or with any other suitable method. All such variations and modifications are to be considered within the ambit of the present invention, the nature of which is to be determined from the foregoing description.

It will be understood that the invention disclosed and defined in this specification extends to all alternative combinations of two or more of the individual features mentioned or evident from the text or drawings. All of these different combinations constitute various alternative aspects of the invention.

Although the description has been described with respect to particular embodiments thereof, these particular embodiments are merely illustrative, and not restrictive.

Particular embodiments may be implemented in a computer-readable storage medium for use by or in connection with an instruction execution system, apparatus, system, or device. Particular embodiments can be implemented in the form of control logic in software, firmware, hardware or a combination of those. The control logic, when executed by one or more processors, may be operable to perform that which is described in particular embodiments. For example, a tangible medium such as a hardware storage device can be used to store the control logic, which can include executable instructions.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for inverse channel transfer function estimation in a radio receiver, comprising:
   in the radio receiver, receiving a modulated signal including a received pilot and storing a frequency-domain representation of the modulated signal in a buffer;
   in a digital processing unit included in the radio receiver, calculating a value representing a power of the received pilot;
   determining a bit-shift value;
   left-shifting the value representing the received pilot's power by the bit-shift value;
   using a CORDIC algorithm to divide a local reference pilot value by the left-shifted value representing the received pilot's power, obtaining a division result;
   left-shifting the division result by the bit-shift value; and
   multiplying the left-shifted division result with a conjugate value of the received pilot to obtain an inverse channel transfer function estimate.

2. The method of claim 1, wherein calculating the value representing the power of the received pilot comprises at least one of:
   squaring a received pilot amplitude;
   squaring an absolute value of a module of the received pilot; and
   squaring a real part of a complex value representing the received pilot and squaring an imaginary part of the complex value representing the received pilot, and adding the results of the squared real and imaginary parts.

3. The method of claim 1, further comprising obtaining multiple inverse channel transfer function estimates and performing interpolation using the multiple inverse channel transfer function estimates.

4. The method of claim 3, wherein interpolation is performed according to the Farrow method.

5. The method of claim 1, further comprising multiplying at least parts of the received modulated signal with the inverse channel transfer function estimate to obtain an equalized received modulated signal.

6. The method of claim 1, wherein determining the bit-shift value comprises:
   initializing the bit-shift value at zero;
   calculating a value representing the received pilot's power multiplied by (2 to a power of the bit-shift value) to obtain a left-shift candidate;
   comparing the left-shift candidate with a threshold value to determine if the left-shift candidate is smaller than the threshold;
   in response to determining that the left-shift candidate is smaller than the threshold, incrementing the bit-shift value and repeating the steps of obtaining a left-shift candidate and comparing the left-shift candidate with the threshold value.

7. The method of claim 1, wherein the modulated signal is is carried by a single carrier.

8. The method of claim 1, wherein the modulated signal is carried by multiple carriers and includes an OFDM symbol.

9. An apparatus for inverse channel estimation, comprising:
   a buffer configured for storing a frequency-domain representation of a modulated signal including a pilot;
   a pilot power calculator coupled with the buffer and operationally configured to calculate a power of a pilot value by squaring an absolute value of the pilot value;
   a conjugate value calculator coupled with the buffer and operationally configured to calculate a conjugate of the pilot value by inverting a sign of an imaginary part of the pilot value;
   a first left-shift circuit with an input coupled with an output of the first processing unit;
   a CORDIC unit operationally configured to perform a division on a numerator input signal and a denominator input signal, wherein the numerator input is configured for receiving a local reference pilot signal, and wherein the denominator input is coupled with the left-shift module output;
   a second left-shift circuit with an input coupled with an output of the CORDIC unit; and
   a first multiplier including a real input and a complex input, wherein the real input is coupled with a second left-shift module output, and the complex input is coupled with a second processing unit output, and including an output configured to provide an output signal that is a multiplication of a first signal on the real input and a second signal on the complex input.

10. The apparatus of claim 9, further comprising a unit for at least one of retrieving and generating a local reference pilot.

11. The apparatus of claim 9, further including an interpolator coupled with the first multiplier output.

12. The apparatus of claim 9, further comprising a second multiplier having an inverse estimate input coupled with the first multiplier output and a received signal input coupled with the buffer, and including an equalizer output configured to provide an equalizer output signal that is a complex multiplication of a signal on the inverse estimate input and a signal on the received signal input.

13. A system for channel estimation, comprising a digital signal processor coupled with a program memory and coupled with a data memory, the digital signal processor configured to control a read address of the program memory and to control a read and a write address of the data memory, wherein the digital signal processor is operatively configured to read and execute software instructions stored in the program memory, the software instructions comprising:
  receiving a modulated signal including a received pilot and storing a frequency-domain representation of the modulated signal in at least one of a data memory and a buffer;
  calculating a value representing a power of the received pilot;
  determining a bit-shift value;
  left-shifting the value representing the received pilot's power by the bit-shift value;
  using a CORDIC algorithm to divide a local reference pilot value by the left-shifted value representing the received pilot's power, obtaining a division result;
  left-shifting the division result by the bit-shift value; and
  multiplying the left-shifted division result with a conjugate value of the received pilot to obtain an inverse channel transfer function estimate.

14. The system of claim 13, wherein the data memory and the program memory are combined in a single memory.

* * * * *